United States Patent
Yao

(10) Patent No.: US 7,417,766 B2
(45) Date of Patent: *Aug. 26, 2008

(54) CALIBRATION OF COLOR DEVICES

(75) Inventor: Meng Yao, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 822 days.

This patent is subject to a terminal disclaimer.

(21) Appl. No.: 10/945,627

(22) Filed: Sep. 20, 2004

(65) Prior Publication Data

US 2006/0061783 A1    Mar. 23, 2006

(51) Int. Cl.
*G06F 15/00* (2006.01)
(52) U.S. Cl. .................. 358/1.9; 358/504; 358/518; 358/525; 358/529
(58) Field of Classification Search ............. 358/1.9, 358/504, 518, 525, 529
See application file for complete search history.

(56) References Cited

U.S. PATENT DOCUMENTS

2006/0061782 A1* 3/2006 Yao ........................ 358/1.9

* cited by examiner

*Primary Examiner*—Twyler L. Haskins
*Assistant Examiner*—Michael Burleson
(74) *Attorney, Agent, or Firm*—Fay Sharpe LLP

(57) ABSTRACT

A method of adjusting a non-black primary color value including determining first, second and third portions of the non-black primary color value; determining an adjusted first portion using a first one-dimensional look-up table, wherein the first portion is used as an index to the first one-dimensional look-up table; determining an adjusted second portion using a second one-dimensional look-up table, wherein the second portion is used as an index to the second one-dimensional look-up table; and summing the adjusted first portion, the adjusted second portion and the third portion.

5 Claims, 2 Drawing Sheets

CALIBRATION OF COLOR DEVICES

BACKGROUND

The subject disclosure is generally directed to color printing.

Color printers typically employ a plurality of inks of different primary colors to generate a spectrum of colors. For example, many color printers use four ink colors: cyan (C), magenta (M), yellow (Y) and black (K). Color images are formed on a receiving substrate or medium by placing combinations of zero or more dots of C, M, Y or K ink at each pixel location. Cyan, magenta and yellow are typically employed since a wide range of colors can be produced by different combinations of these inks.

It can be difficult to calibrate color printers.

DETAILED DESCRIPTION

Figure 1:
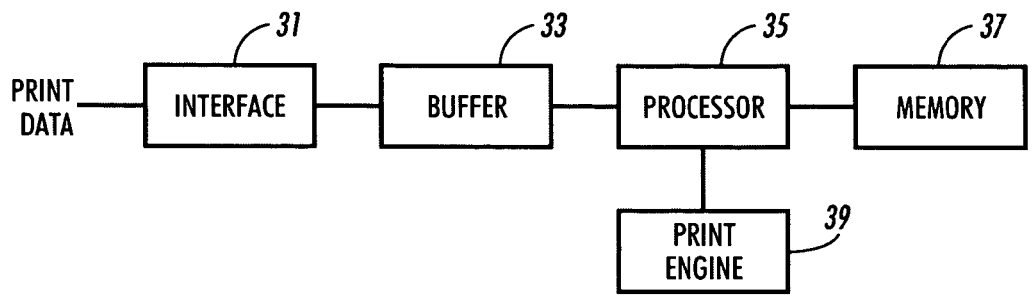
FIG. 1 is a schematic block diagram of an embodiment of a printing system.

FIG. 1 is a schematic block diagram of an embodiment of a printing apparatus that includes an interface 31 that receives print data, for example from a host computer, and stores the print data in a buffer memory 33. A processor 35 is configured to process the print data to produce bit mapped raster data that is stored in a memory 37. A print engine 39 prints an image pursuant to the bit map raster data generated by the processor 35. The print engine 39 can be an electrophotographic print engine or an ink jet print engine, for example.

Figure 2:
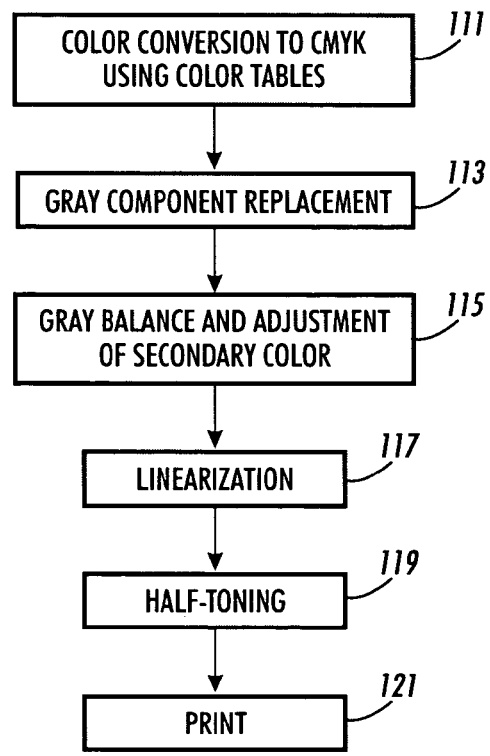
FIG. 2 is a schematic diagram of an embodiment of an image processing pipeline.

FIG. 2 is a block diagram of an embodiment of a portion of an image processing pipeline for a color printer. At 111 input color data is transformed to printer color space such as CMYK which employs the primary colors of cyan, magenta, yellow and black, for example using color tables. At 113 gray component replacement is performed on printer primary color data, wherein some amounts of the non-black primary colors are replaced with black. At 115 gray balancing and secondary color adjustment are performed for each non-black primary color using a plurality of one-dimensional tone reproduction curves (TRCs), as disclosed more particularly herein. At 117 linearization is performed. At 119 half-toning is performed, and at 121 printing takes place. In practice, the step 117 of linearization can be merged into the step 119 of half toning. The one-dimensional TRCs employed in the disclosed embodiments can be implemented as one-dimensional look-up tables, for example.

The adjustments at 115 and 117 can be employed to calibrate the printing apparatus, for example. For ease of reference, the embodiments disclosed herein employ C, M, Y, K primary colors.

Figure 3:
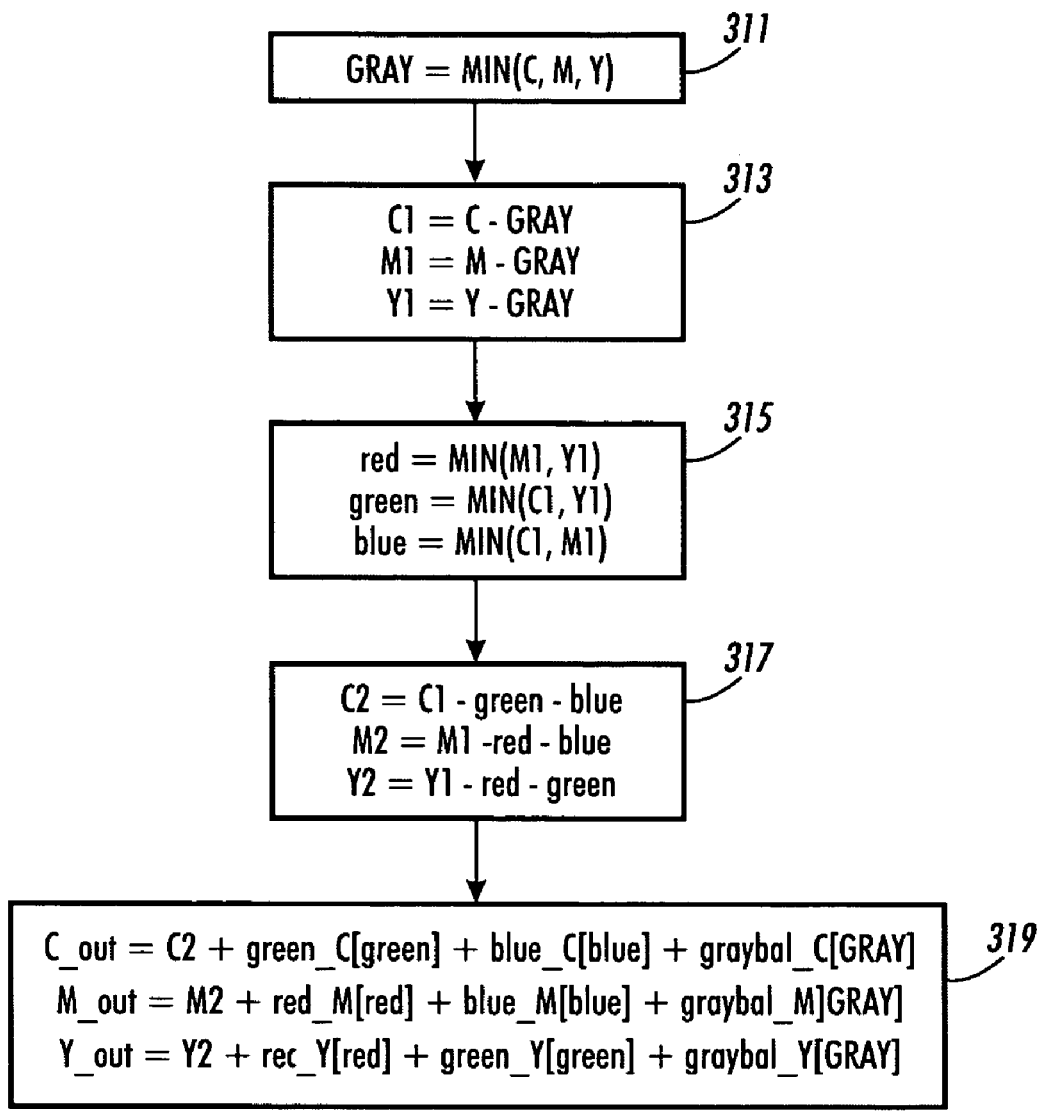
FIG. 3 is an embodiment of a procedure for adjusting secondary colors and gray using a plurality of one-dimensional look-up tables for each non-black primary color.

FIG. 3 is a schematic flow diagram of an embodiment of a procedure that can be employed at 115 (FIG. 2) for adjusting a gray component and a secondary color component of non-black primary color values, such as CMY, using a plurality of one-dimensional TRCs for each non-black primary color.

At 311 a GRAY component is set to the minimum of the original or input non-black primary colors C, M, Y values. As to each of such C, M, Y values, GRAY comprises the amount of a non-black primary color that contributes to the gray of the particular C, M, Y data and can be called a gray component of a non-black primary color.

At 313 the GRAY component is subtracted from each of the non-black primary color inputs C, M, Y to arrive at versions C1, M1, Y1 of the non-black primary colors from which the GRAY component has been removed.

At 315 the secondary colors red, green and blue are set to the minimums of the appropriate combinations (M1, Y1), (C1, Y1), (C1, M1) of the non-black primary color values from which the GRAY component has been removed. As to each of the C, M, Y values, green comprises the amounts of cyan and yellow that contribute to the green secondary color of the particular C, M, Y data, blue comprises the amounts of cyan and magenta that contribute to the blue secondary color of the particular C, M, Y data, and red comprises the amounts of magenta and yellow that contribute to the red secondary color of the particular C, M, Y data. It should be appreciated that in this example there is at most one non-zero secondary color for any set of C, M, Y values, since at least one of C1, M1, Y1 as calculated at 313 is zero. The portion of a non-black primary color value that contributes to a secondary color can be conveniently called a secondary color component of the non-black primary color value (e.g., the green component of the cyan color value, the blue component of the cyan color value, etc.). For ease of reference, a secondary color component of a primary color value can sometimes be called a secondary component of a primary color (e.g., the blue component of magenta, the red component of magenta, etc.).

At 317 a primary component of each of the non-black primary color values is obtained by subtracting appropriate secondary color components from the non-black primary color values from which the GRAY component has been removed. In particular, green and blue are removed from C1 to obtain a primary component C2 of the cyan color value C, red and blue are removed from M1 to obtain a primary component M2 of the magenta color value M, and red and green are removed from Y1 to obtain a primary component Y2 of the yellow color value Y. While the C, M, Y values form at most one secondary color in this example, the equations at 317 are generalized to include the three possible secondary colors.

At 319 respective adjusted non-black primary color values are obtained by summing for each non-black primary color a respective adjusted gray component that has been adjusted for balancing gray, a respective adjusted secondary color component, and the primary component.

In particular as to cyan, at 319 a gray and secondary color adjusted cyan color value C_out can be obtained by:

$$C\_out = C2 + green\_C[green] + blue\_C[blue] + graybal\_C[GRAY]$$

wherein C2 comprises the primary component of the cyan color value C, green_C[ ] comprises a one-dimensional green related cyan TRC that is indexed by the green component of the cyan color value C, blue_C[ ] comprises a one-dimensional blue related cyan TRC that is indexed by the blue component of the cyan color value C, and graybal_C[ ] is a one-dimensional gray balancing related cyan TRC for balancing gray that is indexed by the gray component.

In particular as to magenta, at 319 a gray and secondary color adjusted magenta color value M_out can be obtained by:

$$M\_out = M2 + red\_M[red] + blue\_M[blue] + graybal\_M[GRAY]$$

wherein M2 comprises the primary component of the magenta color value M, red_M[ ] comprises a one-dimensional red related magenta TRC that is indexed by the red component of the magenta color value M, blue_M[ ] comprises a one-dimensional blue related magenta TRC that is indexed by the blue component of the magenta color value M, and graybal_M[ ] is a one-dimensional gray balancing related magenta TRC for balancing gray that is indexed by the gray component.

In particular as to yellow, at 319 a gray and secondary color adjusted yellow color value Y_out can be obtained by:

$$Y\_out = Y2 + red\_Y[red] + green\_Y[green] + graybal\_Y[GRAY]$$

wherein Y2 comprises the primary component of the yellow color value Y, red_Y[ ] comprises a one-dimensional red related yellow TRC that is indexed by the red component of the yellow color value Y, green_Y[ ] comprises a one-dimensional green related yellow TRC that is indexed by the green component of the yellow color value Y, and graybal_Y[ ] is a one-dimensional gray balancing related yellow TRC for balancing gray that is indexed by the gray component.

Generally, for each non-black primary color, a gray portion or component, a secondary color portion or component, and a primary portion or component are determined. A non-zero non-black primary color can include one or more of such components. For each non-black primary color, an adjusted gray component is obtained using the gray component as an index to a gray balancing related primary color TRC, and an adjusted secondary color component is obtained using the secondary color component as an index to a secondary color related primary color TRC. A gray and secondary color adjusted non-black primary color value is obtained by combining the primary component, the adjusted secondary color and the adjusted gray component.

The one-dimensional green related cyan and yellow TRCs that are indexed by the green component can be obtained by printing green patches at different coverages and linearizing them based on L*, ΔE, etc. Hue adjustment can be incorporated into the green related cyan and/or yellow TRCs to make green more cyan or more yellow, for example depending upon the desired calibration. If no hue adjustments to green are to be made, green_C[ ] and green_Y[ ] can be identical.

The one-dimensional blue related cyan and magenta TRCs and the red related magenta and yellow TRCs can be obtained similarly.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of adjusting a non-black primary color value comprising:
    determining a gray component of the non-black primary color value that contributes to a gray color;
    determining a secondary color component of the non-black primary color value that contributes to a secondary color;
    determining a primary component of the non-black primary color value that does not contribute to the gray color or the secondary color;
    determining an adjusted gray component using a one-dimensional gray balancing related primary color look-up table;
    determining an adjusted secondary color component using a one-dimensional secondary color related primary color look-up table; and
    summing the adjusted gray component, the adjusted secondary color component and the primary component.

2. The method of claim 1 wherein determining an adjusted gray component comprises obtaining a gray balancing related primary color TRC value from a one-dimensional gray balancing related primary color TRC for balancing gray using the gray component as an index.

3. The method of claim 1 wherein determining an adjusted secondary color component comprises obtaining a secondary color related primary color TRC value from a one-dimensional secondary color related primary color TRC using the secondary color component as an index.

4. A method of adjusting a non-black primary color value comprising:
    determining first, second and third portions of the non-black primary color value;
    determining an adjusted first portion using a first one-dimensional look-up table, wherein the first portion is used as an index to the first one-dimensional look-up table;
    determining an adjusted second portion using a second one-dimensional look-up table, wherein the second portion is used as an index to the second one-dimensional look-up table; and
    summing the adjusted first portion, the adjusted second portion and the third portion.

5. A method of adjusting each of a plurality of associated non-black primary color values comprising:
    determining for each non-black primary color value a respective gray component that contributes to a gray color, a respective secondary color component that contributes to a secondary color, and a respective primary component that does not contribute to the gray color or the secondary color;
    determining for each non-black primary color a respective adjusted gray contribution using a respective gray balancing related one-dimensional look-up table, wherein the respective gray component is used as an index to the respective gray balancing related one-dimensional look-up table;
    determining for each non-black primary color a respective adjusted secondary color component using a respective one-dimensional secondary color related look-up table, wherein the respective secondary color component is used as an index to the respective one-dimensional secondary color related look-up table; and
    summing the respective adjusted gray component, the respective adjusted secondary color component, and the respective primary component for each non-black primary color to obtain adjusted non-black primary color values.

* * * * *